(12) United States Patent
Cazaux et al.

(10) Patent No.: US 8,451,354 B2
(45) Date of Patent: May 28, 2013

(54) TDI IMAGE SENSOR IN CMOS TECHNOLOGY WITH HIGH VIDEO CAPTURE RATE

(75) Inventors: Yvon Cazaux, Grenoble (FR); Benoit Giffard, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 93 days.

(21) Appl. No.: 13/103,492

(22) Filed: May 9, 2011

(65) Prior Publication Data

US 2011/0279725 A1 Nov. 17, 2011

(30) Foreign Application Priority Data

May 17, 2010 (FR) .................................... 10 02066
Jun. 3, 2010 (FR) .................................... 10 02360
Jul. 9, 2010 (FR) .................................... 10 02909

(51) Int. Cl.
*H04N 3/14* (2006.01)
*H04N 5/335* (2011.01)

(52) U.S. Cl.
USPC .......................................... 348/295; 348/308

(58) Field of Classification Search
CPC .. H04N 5/3743; H04N 5/37206; H04N 3/1525
USPC .................. 348/295, 316, 323, 322, 324, 305
See application file for complete search history.

(56) References Cited

U.S. PATENT DOCUMENTS

| | | | | |
|---|---|---|---|---|
| 4,280,141 A | * | 7/1981 | McCann et al. | 348/295 |
| 4,870,293 A | * | 9/1989 | Elabd | 348/295 |
| 5,828,408 A | * | 10/1998 | Mottin et al. | 348/295 |
| 6,906,749 B1 | * | 6/2005 | Fox | 348/295 |
| 7,417,243 B2 | * | 8/2008 | Katzir et al. | 250/559.45 |
| 7,675,561 B2 | * | 3/2010 | Lepage | 348/295 |
| 7,897,902 B2 | * | 3/2011 | Katzir et al. | 250/208.1 |
| 7,952,633 B2 | * | 5/2011 | Brown et al. | 348/295 |

(Continued)

FOREIGN PATENT DOCUMENTS

| EP | 2 154 879 A1 | 2/2010 |
|---|---|---|
| FR | 2 906 080 A1 | 3/2008 |

OTHER PUBLICATIONS

Tsai et al.; "A Time-Delay-Integration CMOS readout circuit for IR scanning"; Jan. 2002; 9th International Conference on Electronics, Circuits and Systems, 2002; IEEE; vol. 1; pp. 347-350.*

(Continued)

*Primary Examiner* — John Villecco
(74) *Attorney, Agent, or Firm* — Oliff & Berridge, PLC

(57) ABSTRACT

An time-delay-integration image sensor comprises a matrix of photosensitive pixels organized in rows and columns, a first matrix of memory cells associated with control and adding means to store accumulated brightness levels of several rows of pixels in a row of memory cells. The first memory cell matrix is provided with the control and adding means to store in its rows accumulated brightness levels of the rows of a first half of the pixel matrix. The sensor comprises a second memory cell matrix associated with the control and adding means to store accumulated brightness levels of the rows of the second half of the pixel matrix in a row of the second memory cell matrix. Means are provided for adding the levels accumulated in a row of the first memory cell matrix to the levels accumulated in a corresponding row of the second memory cell matrix.

11 Claims, 7 Drawing Sheets

U.S. PATENT DOCUMENTS

| | | | |
|---|---|---|---|
| 8,085,327 B2* | 12/2011 | Schrey et al. | 348/308 |
| 8,119,969 B2* | 2/2012 | Katzir et al. | 250/208.1 |
| 2004/0159861 A1 | 8/2004 | Mori et al. | |
| 2006/0256221 A1 | 11/2006 | Mckee et al. | |
| 2007/0012865 A1 | 1/2007 | Katzir et al. | |
| 2008/0210993 A1 | 9/2008 | Oshikubo et al. | |
| 2008/0211940 A1 | 9/2008 | Hynecek | |
| 2009/0295971 A1 | 12/2009 | Tsuchiya | |
| 2011/0019044 A1* | 1/2011 | Wang et al. | 348/295 |
| 2011/0298956 A1* | 12/2011 | Giffard et al. | 348/308 |
| 2012/0206634 A1* | 8/2012 | Katzir et al. | 348/295 |

OTHER PUBLICATIONS

Lepage et al.; "Time-Delay-Integration Architectures in CMOS Image Sensors"; Nov. 2009; IEEE Transactions on Electron Devices; vol. 56, No. 11; pp. 2524-2533.*

Cheng et al.; "Time Delay Integration readout with adjacent pixel signal transfer for CMOS image sensor"; Apr. 2012; 2012 International Symposium on VLSI Design, Automation, and Test (VLSI-DAT); pp. 1-4, 23-25.*

Spartiotis et al., "X- and Gamma Ray Imaging Systems based on CdTe-CMOS Detector Technology," IEEE Nuclear Science Symposium Conference Record, 2008, pp. 518-522.

Lepage et al., "Time-Delay-Integration Architectures in CMOS Image Sensors," *IEEE Transactions on Electron Devices*, 2009, vol. 56, No. 11, pp. 2524-2533.

Farrier et al., "A Large Area TDI Image Sensor for Low Light Level Imaging," *IEEE Journal of Solid-State Circuits*, 1980, vol. SC-15, No. 4, pp. 753-758.

Benoit Giffard et al., U.S. Appl. No. 13/152,333, filed Jun. 3, 2011.

* cited by examiner

Fig 4
Related Art
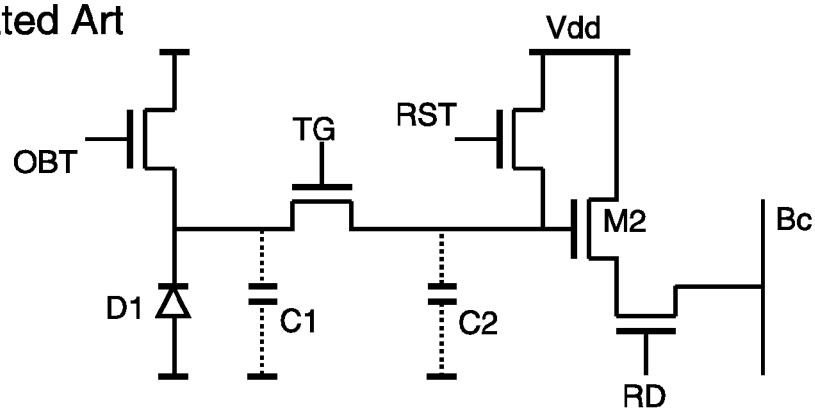
Fig 5
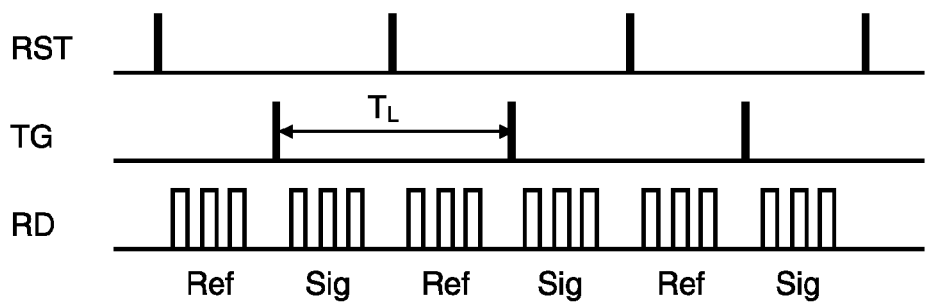
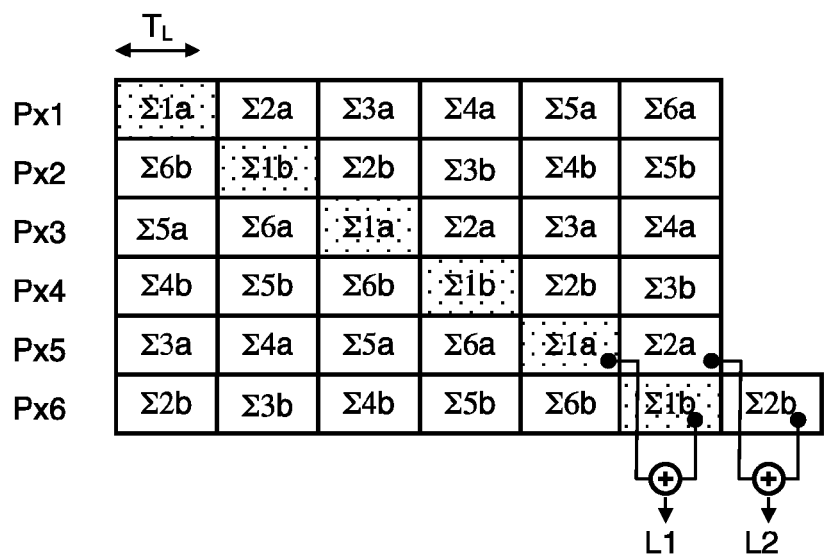
Fig 6

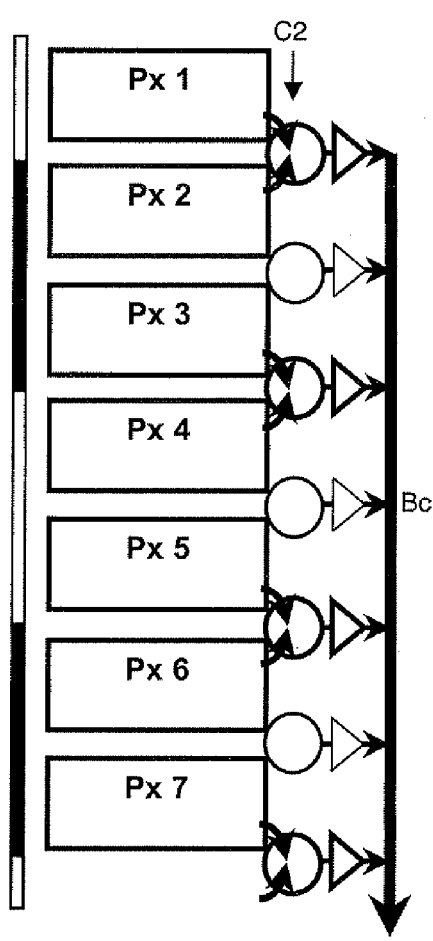 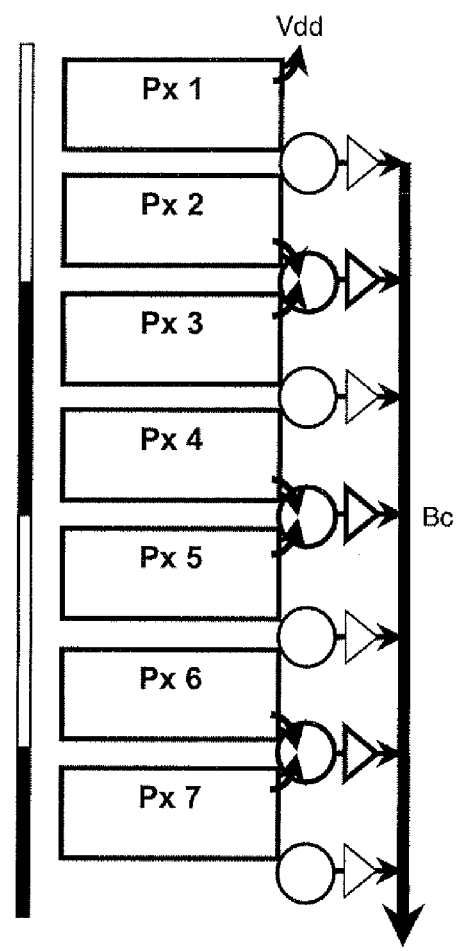
Fig 10a          Fig 10b
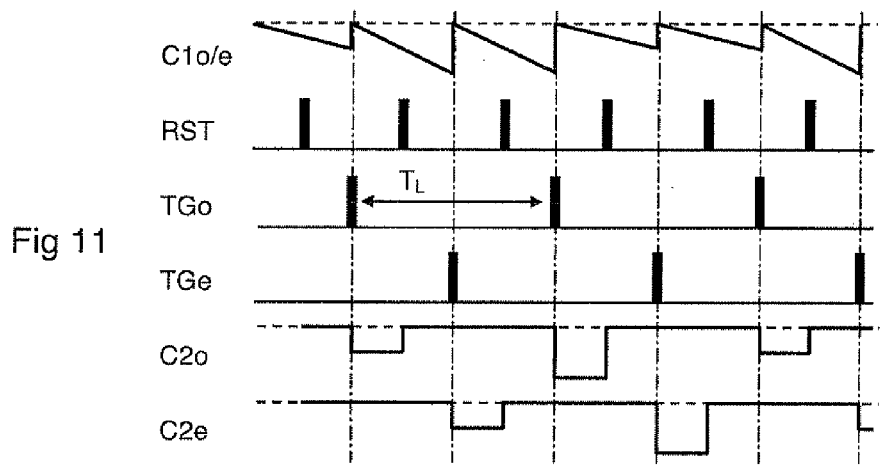
Fig 11

TDI IMAGE SENSOR IN CMOS TECHNOLOGY WITH HIGH VIDEO CAPTURE RATE

BACKGROUND OF THE INVENTION

The invention relates to a linear image sensor designed to capture an image by scanning, and in particular to a Time-Delay-Integration (TDI) sensor.

STATE OF THE ART

The principles of a TDI image sensor are described for example in the article entitled "A Large Area TDI Image Sensor for Low Light Level Imaging" by Michael G. Farrier et al—IEEE Journal of Solid-State Circuits, Vol. SC-15, No. 4, August 1980.

A TDI sensor is generally used to capture the image of an object moving at high speed and observed under poor lighting conditions. It is generally implemented using CCD (Charge-Coupled Device) technology which has so far enabled the best performances to be obtained in terms of sensitivity.

FIG. 1 schematically represents a TDI sensor in CCD technology as described in the above-mentioned article. It comprises a matrix of photosensitive sites, or photosites 10 whereof the rows are generally, as represented, considerably longer than the columns. In the example of the above-mentioned article, a row comprises 1028 photosites, whereas a column only comprises 128 photosites. For earth photography via satellite, a row can comprise some 12,000 photosites and the matrix comprises several tens of rows.

The rows of the matrix are arranged perpendicularly to the motion of the object whereof the image is to be captured. Motion of this image relative to the sensor is represented by descending arrows. These arrows also correspond to movement of the electric charges in the CCD registers, in synchronism with the motion of the image.

Each row captures a corresponding slice of the object during an exposure time compatible with the speed of the image. This results in an accumulation of negative charges (electrons) in the photosites of the row.

When a slice of the image captured by a row i is moved to the level of row i+1, the charges accumulated in row i are transferred to row i+1, which, during a new exposure time, continues to accumulate charges for the same slice. Charge transfers from one row to the next therefore take place in synchronism with motion of the image.

At each transfer cycle, the last row of the matrix thus contains the sum of the charges accumulated by all the rows for one and the same slice. The sensitivity of the sensor is therefore in theory multiplied by the number of rows.

At the end of each charge transfer and exposure cycle, the charges of the last row of the matrix are transferred into a shift register 12 whereof the purpose is to read the data of the last row. The charges stored in the photosites of this register are shifted photosite by photosite to a charge-voltage converter 14 at the end of the row where a voltage corresponding to the total charge of each photosite can be collected by a processing circuit, generally external to the sensor.

As the CCD technology is less and less used for image sensors to the profit of the CMOS technology, the use of the latter technology is envisaged for TDI sensors.

The article entitled "Time-Delay-Integration Architectures in CMOS Image Sensors" by Gerald Lepage, Jan Bogaerts and Guy Meynants—IEEE Transactions on Electron Devices, Vol. 56, No 11, November 2009, describes solutions for obtaining the TDI functionality by means of a CMOS image sensor.

In a CMOS image sensor, light is also captured in the form of charges at pixel level. However, as each pixel is provided with its own voltage read circuit, charges cannot be transferred from one pixel to another.

FIG. 2 schematically represents an architecture envisaged in this article by Lepage et al. A matrix 10' of N×M pixels Px is associated with a matrix 16 of memory cells Σ of the same size and configuration (here N×M=5×5).

In principle, pixel matrix 10' takes views at a rate corresponding to the time (called "line time" $T_L$) taken by an image slice to scan the pitch of the rows of pixels. Thus, after N line times, the same image slice will have been captured by each of the N rows of the pixel matrix. Each row of memory 16 is temporarily associated with the same slice of the image. The brightness levels (i.e signal levels) recorded for this slice by all the rows of pixels is accumulated therein.

Once the levels have been accumulated for the slice, the memory row is read, reset, and associated in circular manner with a new image slice.

It is thus observed that accumulation of all the rows of the pixel matrix has to be performed at each line time.

Whereas in CCD technology the brightness level accumulation operations correspond to simple charge transfers, these operations are notably more complex in CMOS technology. They involve, multiplexing operations on pixel read busses, analog-to-digital conversions, addition operations, and memory access operations. This results in difficulties in CMOS technology to achieve the same view capture rates (or line time $T_L$) as in CCD technology. The resolution of the pixel matrix in number of rows therefore has to be adjusted to the minimum line time envisaged and to the desired pixel pitch.

In certain applications, as described in particular in the above-mentioned article by Lepage et al., each pixel is subdivided in the direction of motion to improve what is referred to as the image motion Modulation Transfer Function (MTF), which is representative of the sharpness of the reproduced image. This involves increasing the number of rows of pixels while at the same time reducing the pitch to preserve the dimensions of the sensor. The temporal constraints increase with the square of the subdivision factor.

To progress from a motion MTF of 0.64 to 0.9, each pixel is subdivided in two in the direction of motion. The temporal constraints are then multiplied by 4.

SUMMARY OF THE INVENTION

It is observed that a need exists to provide a CMOS image sensor with TDI functionality enabling temporal constraints to be relaxed, in particular enabling the motion MTF to be improved.

This need tends to be satisfied by providing a time-delay-integration image sensor comprising a matrix of photosensitive pixels organized in row s and columns, a first analog-to-digital converter for each column connected by a column bus to the outputs of several pixels of the column, a first matrix of memory cells connected to receive the outputs of the first converters, and a control circuit configured to organize read of the pixels on the column busses and write of the outputs of the first converters in the first memory cell so as to store the accumulated brightness levels of several rows of pixels in a row of memory cells.

The first memory cell matrix is configured with the control circuit to store in its rows the accumulated brightness levels of the rows of a first part of the pixel matrix.

The sensor further comprises a second analog-to-digital converter for each column receiving via a column bus the outputs of the pixels of the column belonging to a second part of the pixel matrix, distinct from the first part. A second memory cell matrix is connected to receive the outputs of the second converters, the control circuit being further configured to organize storage of the accumulated brightness levels of the rows of the second part of the pixel matrix in a row of the second memory cell matrix. An adder is provided to sum the levels accumulated in a row of the first memory cell matrix with the levels accumulated in a corresponding row of the second memory cell matrix.

According to one embodiment, the first and second converters are connected to the pixels of the matrix via distinct column busses, and the control circuit is configured to organize simultaneous read, on the busses, of two rows respectively belonging to the first and second parts of the pixel matrix.

According to an alternative embodiment, the first and second converters are connected to the pixels of the matrix via common column busses, and the control circuit is configured to organize two successive reads on the busses of two rows respectively belonging to the first and second parts of the pixel matrix, with a delay corresponding to a sampling period of a converter.

According to a development, the first and second memory cell matrices are arranged on each side of the pixel matrix.

To improve the image motion MTF, there are provided in each pixel of a column, except for the last pixel, a photosensitive element, a storage node, a first transfer transistor connecting the photosensitive element to the storage node and a second transfer transistor connecting the storage node of the pixel to the photosensitive element of the next pixel of the column, and which is connected to be active at the same time as the first transfer transistor.

BRIEF DESCRIPTION OF THE DRAWINGS

Other advantages and features will become more clearly apparent from the following description of particular embodiments of the invention given for non-restrictive example purposes only and illustrated by means of the appended drawings, in which:

FIG. 4 represents a five-transistor pixel of a CMOS sensor;

FIG. 5 is a timing diagram illustrating use of the pixel of FIG. 4 as part of the sensor of FIG. 3;

FIG. 6 is a table representing use of the memories of FIG. 3;

FIGS. 10*a* and 10*b* symbolize a sensor of the type of FIG. 9 in two measuring phases; and FIG. 11 is a timing diagram illustrating operation of a sensor of the type of FIG. 9.

DESCRIPTION OF A PREFERRED EMBODIMENT OF THE INVENTION

In order to relax temporal constraints on operation of a TDI sensor in CMOS technology, a solution is proposed here wherein the time necessary for accumulation operations is divided by two. An important factor in temporal constraints is in fact the time required to accumulate a current brightness level with a value stored in memory.

This is achieved by providing two independent accumulation channels for each column of pixels, each channel being associated with a separate memory, which are used simultaneously or almost simultaneously.

Figure 3:
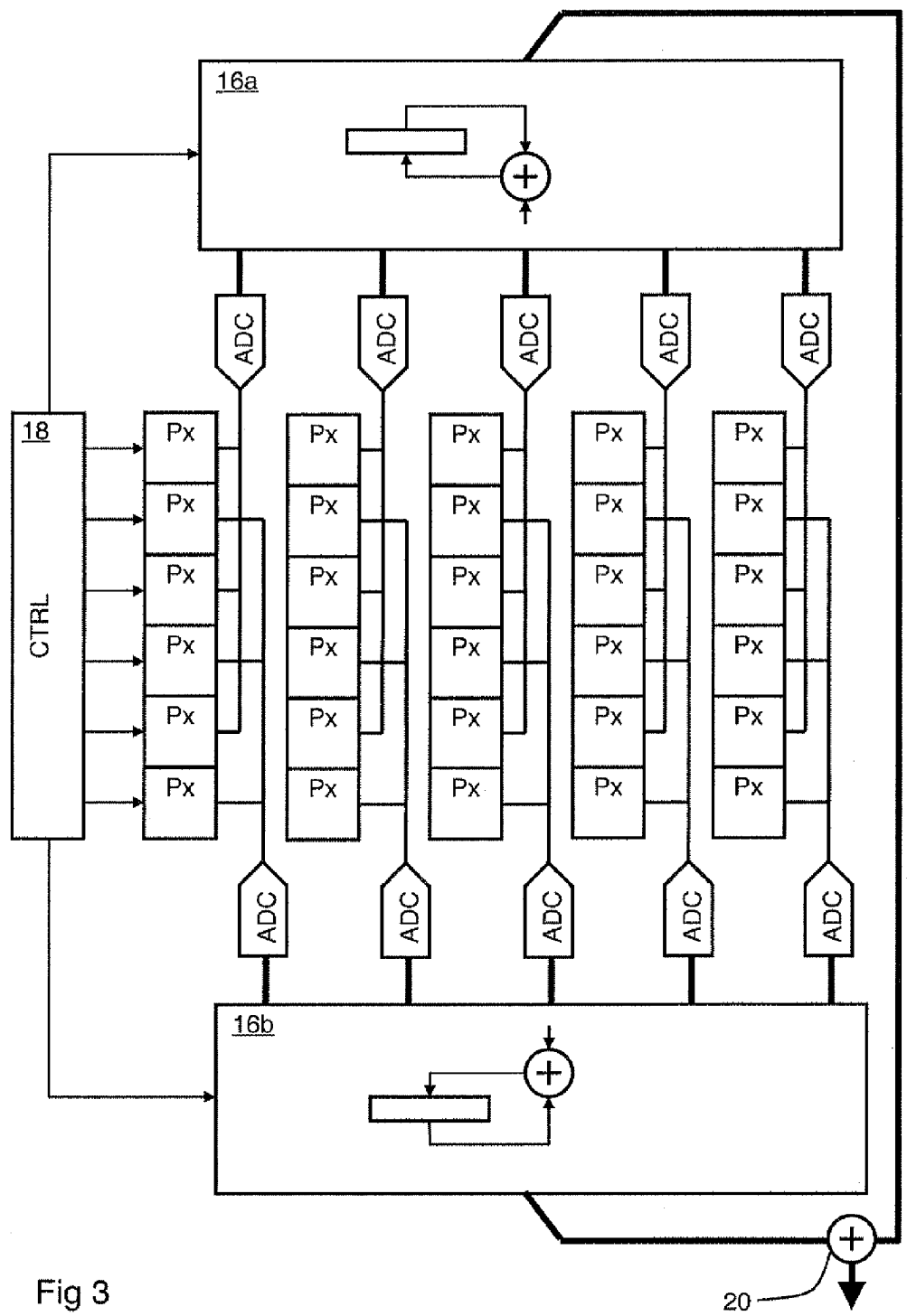
FIG. 3 schematically represents an embodiment of a CMOS TDI sensor enabling temporal constraints to be relaxed.

FIG. 3 schematically represents an embodiment of an architecture enabling this solution to be implemented. The matrix of photosensitive pixels Px is represented with six rows and five columns for example purposes.

In general manner, an accumulation memory 16*a* is associated with a first half of the rows and a separate accumulation memory 16*b* is associated with the second half of the rows. A value corresponding to a pixel of the first half can thus be written in memory 16*a* at the same time as a value corresponding to a pixel of the second half is written in memory 16*b*.

In FIG. 3, accumulation memory 16*a* is associated with the odd rows of the pixel matrix and accumulation memory 16*b* is associated with the even rows of the pixel matrix. The pixels of odd rank and the pixels of even rank of each column are connected here by separate read busses to their respective memories 16*a* and 16*b*. An analog-to-digital converter ADC is provided in each of these busses. The analog levels provided by the pixels are thus converted to digital levels before being accumulated in memories 16*a* and 16*b*.

With this configuration, a value corresponding to an odd pixel can be written in memory 16*a* at the same time as a value corresponding to an even pixel is written in memory 16*b*.

Accumulation takes place for example, as schematized, at the level of the memories by means of an adder which replaces the content of a memory cell by the sum of this content and of the value provided by the corresponding analog-to-digital converter ADC.

The contents of memories 16*a* and 16*b* are accessible via respective busses reaching the two inputs of an adder 20. One adder 20 is provided per column, serving the purpose of completing the partial accumulations made in each of memories 16*a* and 16*b*. The adder can be included in the image sensor or be located remotely, in an external circuit (not represented).

Accumulation memories 16*a*, 16*b* and pixels Px are managed by a control circuit 18, the operation of which will be described in greater detail further on.

Each of accumulation memories 16*a* and 16*b* preferably has the same configuration as the pixel matrix, i.e. in the form of a memory cell matrix of six rows by five columns in the example of FIG. 3. Furthermore, as represented, memories 16*a* and 16*b* are preferably physically located on each side of the pixel matrix, in the direction of the columns. This arrangement facilitates routing connections.

Figure 1:
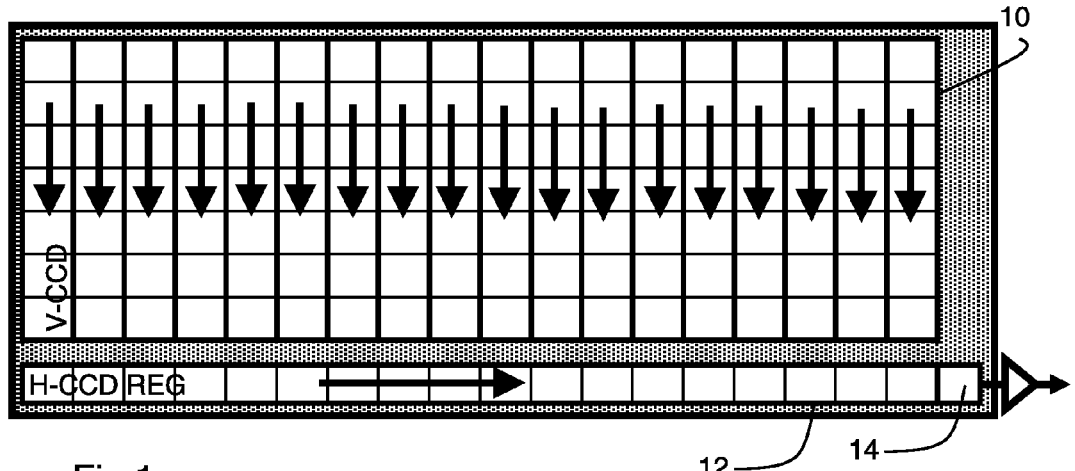
FIG. 1, described in the above, schematically represents a conventional TDI image sensor in CCD technology.
Figure 2:
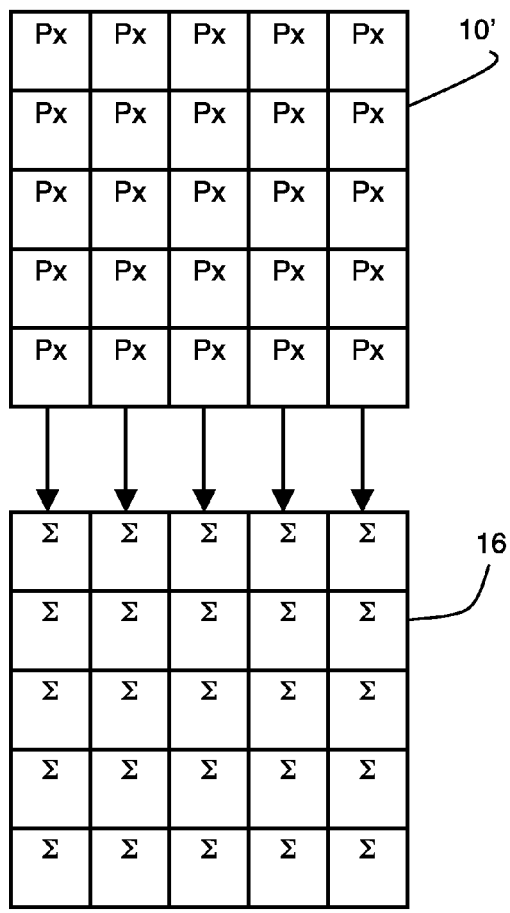
FIG. 2, described in the above, schematically represents a conventional TDI sensor in CMOS technology.

Compared with the conventional configuration of FIG. 2, the memory size is doubled. This does not have a notable influence on the overall dimensions of the sensor, as the sensor generally comprises much fewer rows than columns. A relatively small number of memory rows are thus added which hardly affect the width of the sensor compared with the other components of the sensor, in particular the input/output bumps.

FIG. 4 represents a conventional type of CMOS pixel, named "5T", which can be used in the pixel matrix. It comprises a photodiode D1 which has an intrinsic capacitor C1, or integration capacitor, that enables the charges generated by the light striking the pixel to be accumulated. A transfer transistor TG connects photodiode D1 to the gate of a follower transistor M2. The gate capacitor of transistor M2 and the capacitors of the other components connected to the gate of transistor M2 form a buffer capacitor C2. A read transistor (or line select transistor) RD connects the source of follower transistor M2 to a column bus Bc. A reset transistor RST connects capacitor C2 to a positive power supply line Vdd. A shutter and anti-blooming transistor OBT connects photodiode D1 to line Vdd. For reasons of convenience, the control signals of the transistors have the same name as the transistors in the following.

This type of pixel enables a global shutter sensor to be achieved, i.e. a sensor enabling all of its pixels to be exposed at the same time and enabling the pixel levels to be read successively after exposure. Operation thereof is briefly as follows. Transistor OBT is initially on, keeping capacitor C1 at a reset level. Transistor OBT is off when an exposure phase begins. Transistors TG, RST and RD are also off. Capacitor C1 integrates the charges generated by the light striking photodiode D1. Before the end of exposure, transistor RST is briefly activated to reset buffer capacitor C2. At the end of exposure, transistor TG is briefly activated to transfer the charges from capacitor C1 to buffer capacitor C2. Transistor OBT is briefly activated to reset capacitor C1 for a new exposure phase. During each exposure phase, the voltage level corresponding to the previous exposure is stored in buffer capacitor C2. This voltage level can be transferred at any time to bus Bc by activiting read transistor RD before reset by transistor RST.

Shutter transistor OBT, in addition to resetting integration capacitor C1, can, by means of its off state, serve the purpose of defining an adjustable exposure window between two consecutive actuations of transfer transistor TG. Another function of this transistor is to prevent overflow of charges from capacitor C1 to capacitor C2 during the integration phase. For this, the gate level of transistor OBT is set to a lower value than that of transistor TG to enhance flow of the excess charges via transistor OBT thereby preserving the previous information stored in capacitor C2.

Capacitor C2, of relatively low value to minimize read noise, presents a noised level on reset, called reference level, which is added to the signal level (i.e. the desired level) transferred from capacitor C1. To attenuate the effect of this noise, Correlated Double Sampling (CDS) is generally performed, i.e. the reference levels of the pixels are first sampled, and are then subtracted from the levels sampled after transfer from capacitor C1.

If Correlated Double Sampling is desired in a sensor of the type described here, this means that the reference levels of the pixels also have to be read to subtract them at each exposure from the accumulated values stored in memories 16a and 16b. This contributes to the temporal constraints of this type of sensor. The values of the reference levels are subtracted directly in the accumulation memory cell corresponding to each pixel, the adder in this case being used alternately as adder and then as subtractor.

FIG. 5 is a timing diagram illustrating operation of the sensor of FIG. 3 in greater detail in the case where its pixels are of 5T type.

Successive exposure periods, generally corresponding to line time $T_L$, are defined between periodic activations of transfer transistor TG. Just after each transfer TG, transistor OBT is briefly activated to reset integration capacitor C1 and start the next exposure period. Reset RST of buffer capacitor C2 takes place approximately mid-way between two transfers TG.

Between each reset RST and the next transfer TG, read of the reference levels of each pixel of the column is performed. As the even pixels and odd pixels are connected to independent accumulation memories by independent busses Bc, the levels of an even pixel and of an odd pixel can be read simultaneously. Thus, as represented in the relation with the example of six-pixel columns, three successive reads of pairs of pixels are performed instead of six successive reads of individual pixels being performed in a conventional sensor.

The reference levels thus retrieved are subtracted from the contents of the corresponding memory cells containing the accumulated brightness levels.

Between each transfer TG and the following reset RST, read of the signal levels of each pixel of the column is performed. As for the reference levels, the signal levels of the six pixels of the column are read in three cycles and sent in pairs to the respective accumulation memories 16a and 16b.

The read order of the pixels of a column is of little importance as the summing order does not affect the result. The levels to be read are available throughout a line time $T_L$ on buffer capacitors C2.

The timing diagram of FIG. 5 has been described with the use of 5T pixels. 4T pixels can nevertheless be used in the sensor. In a 4T pixel, there is no shutter transistor OBT. If the production method is of sufficient quality and the shutter and anti-blooming functions of transistor OBT are not required, the reset function of integration capacitor C1 can be performed by transistor TG. Indeed, at each activation of transistor TG, the whole of the charges of capacitor C1 can be transferred to capacitor C2, resulting in reset of capacitor C1 in empty state. Photodiode D1 is then a pinned photodiode.

FIG. 6 is a table illustrating, for a column of pixels Px1 to Px6, an example of management of the corresponding cells Σ of memories 16a and 16b organized by control circuit 18 during operation of the sensor of FIG. 3. The consecutive columns of the table correspond to consecutive line times $T_L$. The cells of memory 16a, corresponding to the odd pixels, are identified by the suffix "a", whereas the cells of memory 16b, corresponding to the even pixels, are identified by the suffix "b". The numbers in the boxes of the table indicate the rank of the cell memory.

The order of use of the cells is of little importance. It is assumed in this example that the levels at the successive line times $T_L$ of one and the same pixel Px are accumulated in cells of increasing rank. The successive levels of pixel Px1 are thus accumulated in cells Σ1a to Σ6a, which are then reused in circular manner.

It is further sought to accumulate the level of the following pixel of the column in the same memory cell, at each line time, until the levels of all the pixels of the column at successive line times have been accumulated in the same cell. This aim is expressed by the hatched cells of the table, starting from the first pixel Px1 at the first line time. Thus, from the first to sixth line time, the levels of pixels Px1 to Px6 are successively accumulated in a cell Σ1. In reality, as the even and odd pixels are associated with different memories, the levels of the odd pixels are accumulated in one cell Σ1a, whereas the levels of the even pixels are accumulated in a cell Σ1b. At the end of the sixth line time, cells Σ1a and Σ1b have each accumulated the levels of a half-column of pixels. At this time, as illustrated, the contents of cells Σ1a and Σ1b are summed to provide the accumulated level of the complete column. This level corresponds to a pixel is of a line L1 of the final image.

In similar manner, starting from the second line time, the levels of the pixels of the column are accumulated in cells Σ2a and Σ2b whereof the contents are summed at the seventh line time to form a new line L2 of the final image.

Figure 7:
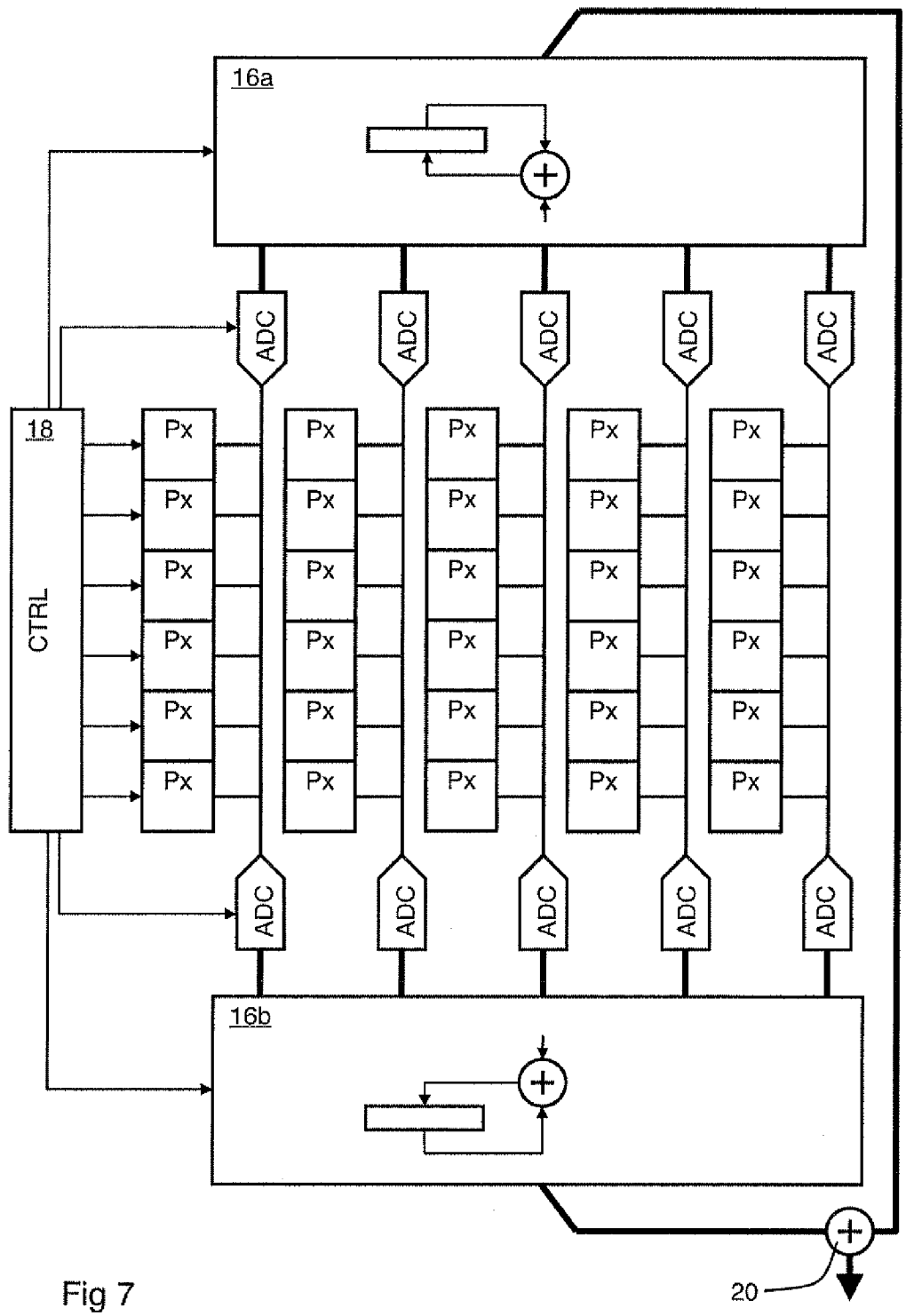
FIG. 7 represents another embodiment of a CMOS TDI sensor.

FIG. 7 represents an alternative embodiment of the sensor of FIG. 3. Instead of providing separate column busses for the even and odd pixels of a column, a single column bus, connected to the two memories 16a and 16b, is provided. Each column bus is thus connected to two ADC converters, one for memory 16a and the other for memory 16b.

This configuration has the advantage of not requiring entangled interconnections between the columns, but it does not enable an odd pixel level and an even pixel level to be transmitted in perfect simultaneity to memories 16a and 16b. Pixel transfers can however be performed to the read busses almost simultaneously.

For this, transfers of odd and even pixels are performed with a slight delay corresponding to the period of time required by the sampling circuits or ADC converters arranged at the ends of the columns. This sampling period is small compared with the time required for conversion and accumulation. More precisely, read of an odd pixel (for example) and sampling of the corresponding odd ADC converter are first activated. As soon as the sampling period has elapsed, sampling of the odd converter and read of the odd pixel are deactivated, and read of an even pixel and sampling of the corresponding even ADC converter are activated. Then, waiting takes place during the time necessary for conversion and accumulation before proceeding in similar manner with two new odd and even pixels.

Compared with the solution of FIG. 3, N/2 sampling delays are added. The processing time of a column however remains considerably shorter than the time required in conventional solutions to perform N consecutive transfers.

Up to now, solutions have been described where the simultaneous (or quasi-simultaneous) reads involve pairs of even and odd pixels. As the read order of the rows during a line time is of little importance, the pixels that are read simultaneously can be of any rank.

Figure 8:
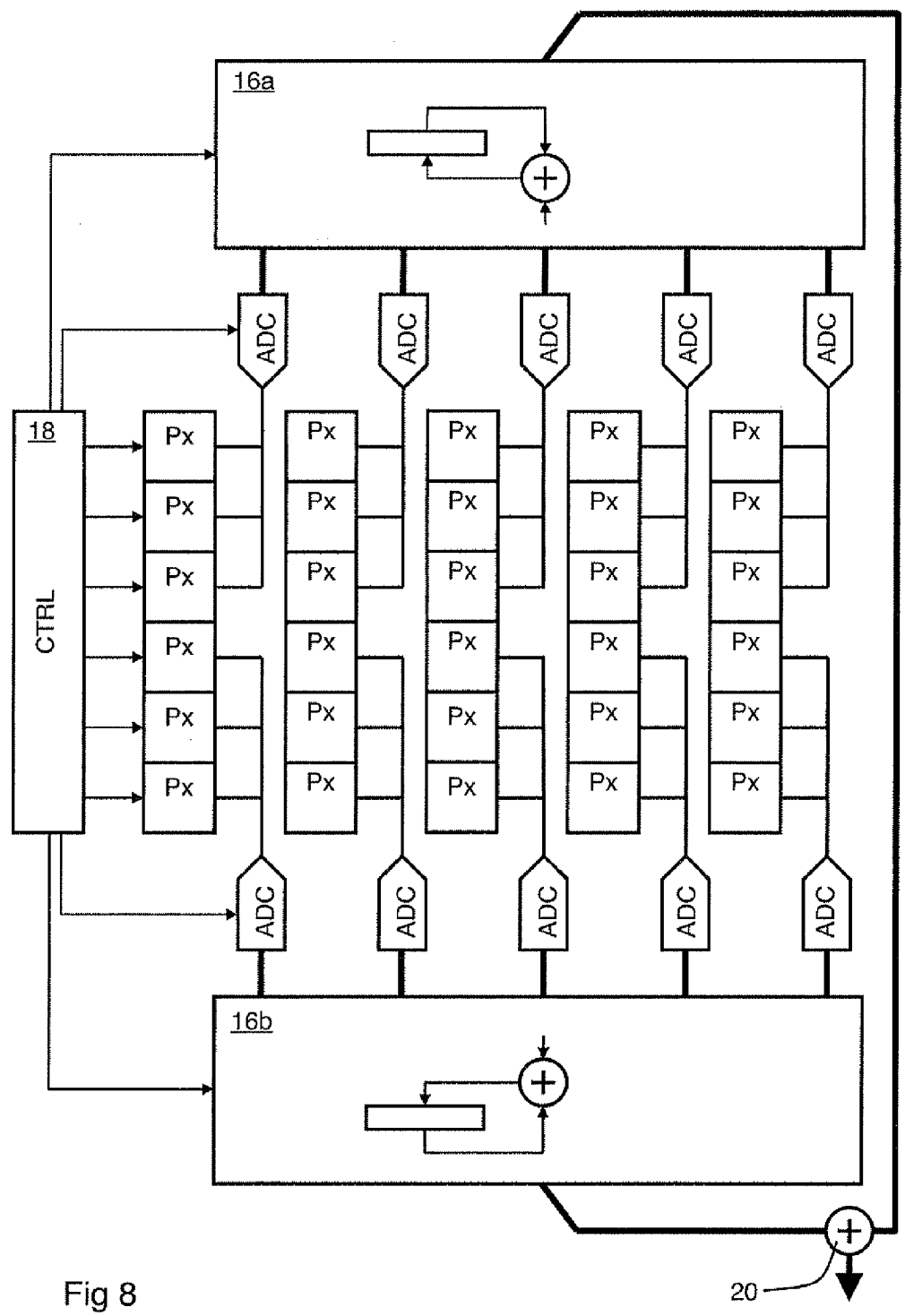
FIG. 8 represents another embodiment of a CMOS TDI sensor.

FIG. 8 represents another alternative embodiment of the sensor of FIG. 3 where the pixels that are read simultaneously are chosen according to another layout. Accumulation memory 16a is here associated with the rows of the top half of the pixel matrix, and accumulation memory 16b is associated with the rows of the bottom half of the pixel matrix. The pixels of the top half and the pixels of the bottom half of each column are connected by separate read busses to their respective memories 16a and 16b.

With this configuration, a value corresponding to a pixel of the top half of the pixel matrix can be written in memory 16a at the same time as a value corresponding to a pixel of the bottom half of the pixel matrix is written in memory 16b.

This solution has the advantage, compared with the structure of FIG. 3, of not requiring entangled interconnections between the columns, while at the same time avoiding the sampling delay required to read the second pixel of each pair in the structure of FIG. 7.

The architecture of the sensor matrix operating in TDI mode can thus comprise twice as many lines integrating in half the time, therefore with a line time that is half as long, so as to minimize the motion effect linked to the displacement of the image on the detector circuit. This architecture with spatial oversampling allows approaching the image motion MTF performances naturally obtained with CCD detectors.

Up to now, solutions have been described enabling the processing time of a pixel column to be divided by two by means of two independent memories. It can naturally be easily understood that the processing time can be divided by K by providing K independent memories.

In a preferred embodiment, the motion MTF is increased by subdividing each pixel in two (or more), as has already been proposed in the foregoing, but by further providing a particular pixel matrix architecture limiting the increase of temporal constraints to the value of the subdivision factor instead of increasing them with the square of the subdivision factor. Thus, by subdividing each pixel in two, the temporal constraints increase by a factor 2 only, instead of 4.

This is obtained by increasing the temporal resolution of the sensor without increasing its spatial resolution. What is meant by "temporal resolution" is the number of measurements made per time unit, whereas what is meant by "spatial resolution" is the number of measurements made per distance unit, Increasing the temporal resolution enables the motion MTF to be improved, whereas keeping the spatial resolution limits the resources required to process the image. The temporal resolution is increased by subdividing each pixel, in the direction of motion, into several sub-pixels covering the same surface as the pixel. The spatial resolution is preserved by aggregating the values of a sliding group of consecutive sub-pixels corresponding to the size of a pixel in a single value. This group "slides" at the same speed as the image, i.e. it shifts at a rate of one pixel in one line time. To effectively increase the temporal resolution, a new aggregation takes place each time the group has shifted by one sub-pixel.

Figure 9:
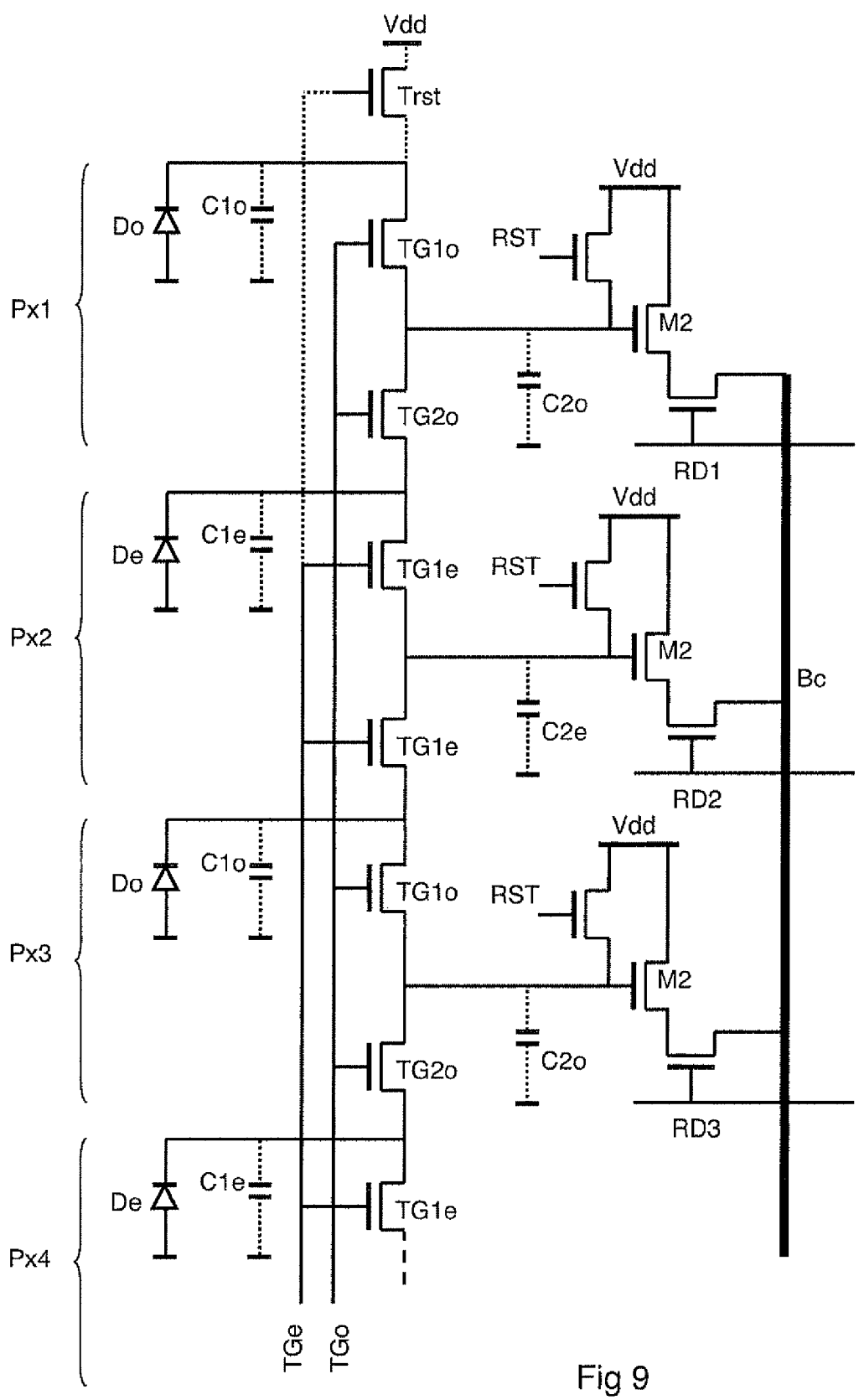
FIG. 9 schematically represents an embodiment of a CMOS TDI sensor enabling the image motion MTF to be improved.

FIG. 9 schematically represents the first pixels of a column of a sensor TDI in CMOS technology whereby this principle can be implemented. This sensor is a global shutter sensor, i.e. all the pixels of the sensor perform an integration at the same time.

In the sensor embodiments described in the following for example purposes, each pixel is subdivided in two in the direction of displacement to increase from a motion MTF of 0.64 to 0.9.

Like a conventional pixel of "4T" type, each pixel Px comprises a photodiode D and its integration capacitor C1, a transfer transistor TG1, a follower transistor M2 and a read transistor RD. The gate capacitor of transistor M2 and the capacitors of the other components connected to the gate of transistor M2 form a buffer capacitor C2, or storage node. Read transistors RD of the pixels of a row are controlled by a selection line common to the row. A reset transistor RST connects capacitor C2 to a positive power supply line Vdd.

For the sake of convenience, the control signals of the transistors have the same name as the transistors in the following. Furthermore, the references of certain elements of the odd pixels have a suffix "o" whereas the references of the same elements of the even pixels have a suffix "e"

Each pixel of FIG. 9 further comprises an additional transfer transistor TG2 connecting capacitor C2 of the pixel to photodiode D of the next pixel of the column (the last pixel of the column will be devoid of such an additional transfer transistor). Transfer transistors TG1 and TG2 of the same pixel are controlled synchronously—for this, their gates receive the same control signal. The two transfer transistors TG1o and TG2o of all the odd pixels are preferably controlled synchronously via a single line TGo, whereas the two transfer transistors TG1e and TG2e of all the even pixels are controlled synchronously via a single line TGe.

It may be desired for the first pixel Px1 of the column to behave in exactly the same way as the other pixels. For this, a reset transistor Trst, connected between the photodiode of pixel Px1 and line Vdd, is for example provided. This transistor Trst is activated by control line TGe of the even pixel transfer transistors. Capacitor C1 of pixel Px1, the charge if which is not transferable to a capacitor C2 of a previous pixel, is thereby reset at the time the even pixel transfer transistors are controlled.

Furthermore, the last pixel of the column is a conventional pixel—it does not comprise a second transfer transistor TG2, as there is no following pixel to which to connect this transistor.

FIGS. 10a and 10b represent a column of pixels of the type of FIG. 9 with two phases of operation of the sensor. The column is parallel to the motion of the image. The circles represent the capacitors C2 and the triangles represent the read circuits (transistors M2 and RD).

The figures correspond to the case where the temporal resolution is divided by two. Each pixel represented is thus in fact a sub-pixel, and two consecutive sub-pixels of the column, which will be designated as "pair of pixels", form a single pixel with the original spatial resolution. As represented, a pair of pixels preferably occupies a square surface, and each pixel is twice as wide as it is high so that the original form factor is preserved.

Facing the column, in the form of a vertical bar, a reference image, or test pattern, has been represented scrolling downwards. The test pattern comprises an alternation of light and dark slices at the pitch of the pair of pixels, i.e. at the Nyquist limit for the original spatial resolution. Each slice thus has the height of a pair of pixels and scans the pair of pixels in a line time $T_L$.

In FIG. 10a, the first dark slice of the test pattern has passed in front of the first two pixels Px1 and Px2 of the column, whereas the first light slice has passed in front of the next two pixels Px3 and Px4 of the column. This configuration is repeated all along the column.

As represented by arrows, the two transfer transistors of each of the odd pixels are activated, thereby the charges integrated by the photodiodes of pixels Px1 and Px2, which have both seen the first dark slice of the test pattern, are summed in first capacitor C2, whereas the charges integrated by the photodiodes of pixels Px3 and Px4, which have both seen the first light slice of the test pattern, are summed in third capacitor C2. This configuration is repeated all along the column so that each capacitor C2 of odd rank, i.e. each capacitor C2o, receives the sum of the charges of the neighboring pair of pixels.

The voltage levels of capacitors C2o will be read in turn on column bus Bc during the next half line time during which a new integration begins on the photodiodes.

In FIG. 10b, corresponding to one half line time later, the first dark slice of the test pattern has shifted by one pixel downwards and has scanned pixels Px2 and Px3, whereas the first light slice has scanned the next two pixels Px4 and Px5. This configuration is repeated all along the column.

As represented by arrows, the two transfer transistors of each of the even pixels are activated, thereby the charges integrated by the photodiodes of pixels Px2 and Px3, which have both seen the first dark slice of the test pattern, are summed in second capacitor C2, whereas the charges integrated by the photodiodes of pixels Px4 and Px5, which have both seen the first light slice of the test pattern, are summed in fourth capacitor C2. This configuration is repeated all along the column so that each capacitor C2 of even rank, i.e. each capacitor C2e, receives the sum of the charges of the neighboring pair of pixels.

The voltage levels of capacitors C2e will be read in turn on column bus Bc during the next half line time. The voltage levels of odd capacitors C2o will have been read during the current half line time.

It can be observed that the same image slice is thus able to be sampled every half line time, i.e. a temporal resolution twice as high is achieved, by using at each sampling a pair of pixels whereof the information is aggregated, i.e. the spatial resolution is not increased.

This results, as can be ascertained with the help of FIGS. 10a and 10b, in the number of levels to be read on the bus during a line time being proportional to the subdivision factor, instead of being proportional to the square of the subdivision factor. If the levels of the pixels had to be read individually on bus Bc, there would be twice as many reads to perform for each of FIGS. 10a and 10b, i.e. at each half line time.

FIG. 11 is a timing diagram illustrating an example of the variations of the main signals relative to pixels Px1 and Px2 in the course of the phases of FIGS. 10a and 10b, and of the subsequent phases. The timing diagram is subdivided, by vertical mixed lines, into periods equal to a half line time.

The first signal is representative of the average state of charge of capacitors C1 of pixels Px1 and Px2. It will be observed that a zero charge level of capacitors C1 and C2 corresponds to a high potential (for example Vdd), whereas an increasing charge level corresponding to an increasing number of electrons varies in decreasing manner from high potential.

In the course of the first half line time corresponding to FIG. 10a, pixel Px1 sees a transition from the dark slice to a light slice and pixel Px2 sees the dark slice throughout the half line time. Capacitors C1 of pixels Px1 and Px2 charge at weak levels.

Before the end of the first half line time, signal RST is activated to reset capacitors C2. Such a reset is repeated with a period of a line time or preferably of a half line time, as represented.

Activation of the RST signal can take place at any time within a half line time. It is preferably activated, as represented, towards the middle of each half line time, which will enable Correlated Double Sampling to be performed to compensate the reference level. Thus, between activation of RST signal and the end of the half line time, the reference levels are transferred from capacitors C2 to bus Bc so as to be able to subtract these levels from the signal levels transferred in the following phase.

At the end of the first half line time, transfer transistor pairs TGo of odd pixels are activated. The charges of capacitors C1 of pixels Px1 and Px2 are transferred and summed in capacitor C2o of pixel Px1, the voltage level of which presents a stage of corresponding amplitude (weak here).

Transistors TGo are subsequently activated periodically with a period of one line time.

In the course of the second half line time corresponding to FIG. 10b, capacitors C1 of pixels Px2 and Px3 see what pixels Px1 and Px2 saw at the previous half line time. Capacitors C1 of these pixels (level not represented for pixel Px3) charge to low levels, Pixel Px1 seeing a light slice throughout this time, capacitor C1 charges to high level.

At the end of the second half line time, transfer transistor pairs TGe of even pixels are activated. The charges of capacitors C1 of pixels Px2 and Px3 are summed in capacitor C2e of pixel Px2, the voltage level of which presents a stage of corresponding amplitude (again weak).

Transistors TGe are subsequently activated periodically with a period of one line time.

In the course of the third half line time, capacitors C1 of pixels Px1 and Px2 that see a light slice scroll, charge to high levels.

At the end of the third half line time, transfer transistor pairs TGo of odd pixels are again activated. The charges of capacitors C1 of pixels Px1 and Px2 are summed in capacitor C2o of pixel Px1, the voltage level of which presents a stage of corresponding amplitude (high this time).

The half line times thus follow on from one another in similar manner. It can be observed that the levels on capacitors C2 present a substantial periodic variation with a period of a line time, corresponding to the pitch of the test pattern.

By increasing the temporal resolution by a factor 2, without affecting the spatial resolution, the motion MTF is in this way increased from 0.64 to 0.9.

The principle described here is valid for any subdivision factor N, although factors of more than 2 do not substantially improve the motion MTF (0.955 is obtained for a factor 3, and 0.975 for a factor 4).

To increase the temporal resolution by a factor N, which will also increase the temporal constraints by a factor N (instead of $N^2$), each pixel of FIG. 9 comprises a transfer transistor TG1 connecting photodiode D to pixel storage capacitor C2, and N−1 additional transfer transistors (TG2, TG3 ... TGN) connecting storage capacitor C2 to the respective photodiodes of the following N−1 pixels. These N transfer transistors of the pixel are able to be activated at the same time to sum the charges of N photodiodes of the N-uplet of pixels thus formed in pixel storage capacitor C2. A bus with N transfer transistor control lines is provided, the line of rank i being activated at a time $iT_L/N$ of each line time, and controlling the transfer transistors of the pixels of ranks i+kN, where k=0, 1, 2, ....

The embodiment of FIG. 9, combined with the two separate memories of FIG. 3, 7 or 8, enables the image motion MTF to be considerably improved without increasing the temporal constraints. The temporal constraints are in fact are multiplied by two due to the temporal oversampling but divided by two thanks to the two independent accumulation channels.

The invention claimed is:

1. An time-delay-integration image sensor comprising:
   a matrix of photosensitive pixels organized in rows and columns;
   a first analog-to-digital converter for each column, receiving via a column bus the outputs of the pixels of the column, belonging to a first part of the pixel matrix;
   a first memory cell matrix connected to receive the outputs of the first converters; and
   a second analog-to-digital converter for each column, receiving via a column bus the outputs of the pixels of the column, belonging to a second part of the pixel matrix, distinct from the first part;
   a second memory cell matrix connected to receive the outputs of the second converters;
   a control circuit configured to organize read of the pixels on the column busses and write of the outputs of the first and second converters respectively in the first and second memory cell matrices so as to store the accumulated brightness levels of the rows of a first part of the pixel matrix in a row of the first memory cell matrix and store the accumulated brightness levels of the rows of the second part of the pixel matrix in a row of the second memory cell matrix; and
   an adder connected to sum the levels accumulated in a row of the first memory cell matrix with the levels accumulated in a corresponding row of the second memory cell matrix.

2. The image sensor according to claim 1, wherein:
   the first and second converters are connected to the pixels of the matrix by distinct column busses; and
   the control circuit is configured to organize simultaneous read on the busses of two rows respectively belonging to the first and second parts of the pixel matrix.

3. The image sensor according to claim 1, wherein:
   the first and second converters are connected to the pixels of the matrix by common column busses; and
   the control circuit is configured to organize two successive reads, on the busses, of two rows respectively belonging to the first and second parts of the pixel matrix, with a delay corresponding to a sampling period of a converter.

4. The image sensor according to claim 1, wherein the first and second memory cell matrices are arranged on each side of the pixel matrix.

5. The image sensor according to claim 1, wherein the control circuit is configured to control the pixels in such a way that the pixels are exposed simultaneously and read sequentially in rows to the memory cell matrices.

6. The image sensor according to claim 5, wherein the control circuit is configured to perform correlated double sampling of the pixels.

7. The image sensor according to claim 1, wherein each pixel of a column, except the last pixel, comprises:
   a photosensitive element;
   a storage node; and
   a first transfer transistor connecting the photosensitive element to the storage node;
   a second transfer transistor connecting the storage node of the pixel to the photosensitive element of the next pixel of the column, and connected to be active at the same time as the first transfer transistor.

8. The image sensor according to claim 7, wherein, in operation, the first and second transfer transistors of each pixel of odd rank are activated at a first time position of a recurrent line time, and the first and second transfer transistors of each pixel of even rank are activated at a second time position of the line time, different from the first time position.

9. A method for managing a time-delay-integration image sensor comprising the following steps:
   successively reading the brightness levels of the rows of a first part of a matrix of photosensitive pixels to accumulate them in a corresponding row of a first matrix of memory cells;
   successively reading the brightness levels of the rows of a second part, distinct from the first part, of the pixel matrix to accumulate them in a corresponding row of a second matrix of memory cells;
   operating simultaneously to read the levels of a row belonging to the first part of the pixel matrix and of a row belonging to the second part of the pixel matrix, or almost simultaneously with a delay corresponding to a sampling period of an analog-to-digital converter; and
   adding the levels accumulated in the row of the first memory cell matrix to the levels accumulated in the row of the second memory cell matrix.

10. The method according to claim 9, comprising the following steps:
    reading the reference levels of the pixels before each read of the brightness levels of the pixels; and
    subtracting the reference levels from the brightness levels accumulated in the rows of the memory cell matrices.

11. The method according to claim 9, comprising the following steps:
- defining a group of several consecutive pixels in a column of the photosensitive pixel matrix;
- exposing the group of pixels;
- aggregating the information of the pixels of the group;
- shifting the group of pixels by one pixel; and
- repeating from the exposure step.

* * * * *